(12) United States Patent
Bauer

(10) Patent No.: US 8,296,040 B2
(45) Date of Patent: Oct. 23, 2012

(54) METHOD FOR CONTROLLING AN INTERNAL COMBUSTION ENGINE WITH A TEMPERATURE-DEPENDENT INJECTION PARAMETER

(75) Inventor: Achim Bauer, Kusterdingen (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 813 days.

(21) Appl. No.: 12/476,374

(22) Filed: Jun. 2, 2009

(65) Prior Publication Data
US 2009/0299607 A1    Dec. 3, 2009

(30) Foreign Application Priority Data

Jun. 6, 2008 (DE) .......................... 10 2008 027 151

(51) Int. Cl.
*G06F 19/00* (2011.01)
*F02M 51/00* (2006.01)
*F02D 41/04* (2006.01)
(52) U.S. Cl. ......... 701/104; 701/105; 123/480; 123/491
(58) Field of Classification Search .................. 123/435, 123/478, 480, 486, 491; 701/101–105, 113; 702/182
See application file for complete search history.

(56) References Cited

U.S. PATENT DOCUMENTS

| 4,594,986 | A | * | 6/1986 | Shimoda et al. ............... 123/491 |
| 5,485,821 | A | * | 1/1996 | Yoshizawa ..................... 123/478 |
| 5,647,669 | A | | 7/1997 | Schnaibel et al. |
| 5,749,346 | A | * | 5/1998 | Halvorson et al. ............ 123/486 |
| 6,422,482 | B1 | * | 7/2002 | Stier et al. ................... 239/102.2 |
| 6,487,852 | B1 | * | 12/2002 | Murphy et al. ............. 73/114.69 |

FOREIGN PATENT DOCUMENTS

| DE | 4424811 A1 | 1/1996 |
| DE | 102006007417 A1 | 8/2007 |
| EP | 1315896 B1 | 5/2006 |

\* cited by examiner

*Primary Examiner* — Willis R Wolfe, Jr.
(74) *Attorney, Agent, or Firm* — Leydig, Voit & Mayer, Ltd.

(57) ABSTRACT

In a method for controlling an internal combustion engine with direct fuel injection, an injection parameter is determined in dependence on a temperature of the internal combustion engine. The method is characterized in that a first value of the internal combustion engine temperature is determined which, in the event of changes in the operating point of the internal combustion engine, changes comparatively quickly to a value which is characteristic of the new operating point. A second value of the internal combustion engine temperature is formed which, in the event of changes in the operating point, changes comparatively slowly, and in that the injection parameter is defined in dependence on the first value and the second value.

8 Claims, 2 Drawing Sheets

METHOD FOR CONTROLLING AN INTERNAL COMBUSTION ENGINE WITH A TEMPERATURE-DEPENDENT INJECTION PARAMETER

CROSS-REFERENCE TO RELATED APPLICATION

This application claims the priority, under 35 U.S.C. §119, of German application DE 10 2008 027 151.9, filed Jun. 6, 2008; the prior application is herewith incorporated by reference in its entirety.

BACKGROUND OF THE INVENTION

FIELD OF THE INVENTION

The present invention relates to a method for controlling an internal combustion engine with direct fuel injection, in which method an injection parameter is determined in dependence on the temperature of the internal combustion engine.

A method of this type is known from European patent EP 1 315 896 B1. The known method relates to the homogenous operating mode of the internal combustion engine.

The homogeneous operating mode is characterized in that the fuel proportion of a combustion chamber charge is injected a comparatively long time before the ignition of the combustion chamber charge. In a 4-stroke engine, the injection typically begins in the region of charge exchange top dead center, that is to say in the region of the top dead center of the piston at the start of the intake stroke. As a result of the downward and upward movement of the piston which takes place between the injection and the ignition, the injected fuel is distributed homogenously in the combustion chamber.

As a result of the start of the injection which takes place in the region of charge exchange top dead center, the piston crown and injection jet temporarily come into very close proximity. In this way, a part of the injected fuel can condense on the piston crown and is therefore initially unavailable for the mixture formation in the combustion chamber. Even if the initially condensed fuel is at least partially evaporated again before the subsequent ignition, the condensation disrupts the mixture formation process. The disruption leads to increased emissions of hydrocarbons (HC) when the internal combustion engine is cold.

To prevent the increased HC emissions, it is proposed in Euorpoaen patent EP 1 315 896 B1 that the injection be carried out later when the internal combustion engine is at low temperatures than when the internal combustion engine is at relatively high temperatures. As a result of the later injection, there is a greater spacing between the fuel cloud and the piston crown during the period of the injection. The greater spacing reduces the wetting of the piston crown with condensed fuel. As a result, the HC emissions are also reduced in this way when the internal combustion engine is cold. To obtain a homogenous fuel distribution in the combustion chamber despite the shortening of the time between the injection and ignition, it is also proposed in European patent EP 1 315 896 B1 to increase the injection pressure when the internal combustion engine is cold.

The temperature of the internal combustion engine is input into the controller as a piston crown temperature, combustion chamber temperature or coolant temperature or as a value averaged from the variables. It is also the case in European patent EP 1 315 896 B1 that the temperatures can be measured by temperature sensors and/or can be calculated by known models.

A mathematical model for the exhaust-gas temperature is known for example from published, non-prosecuted German patent DE 44 24 811 A1, corresponding to U.S. Pat. No. 5,647,669. In this document, a value of a steady-state exhaust-gas temperature TStat is first determined as a function of the gas throughput of the internal combustion engine. It is also the case in this document that the modeled exhaust-gas temperature TStat differs from the real exhaust-gas temperature in the event of exhaust-gas temperature changes on account of heat capacities in the exhaust system. To be able to model the real exhaust-gas temperature more accurately even in the event of changes in the exhaust-gas temperature, the modeled steady-state exhaust-gas temperature TStat is subjected, in parallel, to two low-pass filtering steps with different time constants. In this way, a quickly changing exhaust-gas temperature signal TAbgS and a slowly changing exhaust-gas temperature signal TAbgL are generated. Both exhaust-gas temperature signals are multiplied by weight factors and are added after the weighting. The result of the addition is a modeled exhaust-gas temperature TAbg.

SUMMARY OF THE INVENTION

It is accordingly an object of the invention to provide a method for controlling an internal combustion engine with a temperature-dependent injection parameter that overcomes the above-mentioned disadvantages of the prior art methods of this general type, which achieves a further reduction of HC emissions in real driving operation.

With the foregoing and other objects in view there is provided, in accordance with the invention, a method for controlling an internal combustion engine with direct fuel injection. The method includes the step of determining an injection parameter in dependence on a temperature of the internal combustion engine, by performing the steps of: determining a first value of the temperature of the internal combustion engine which, in an event of changes in an operating point of the internal combustion engine, changes comparatively quickly to a value which is characteristic of a new operating point; forming a second value of the temperature of the internal combustion engine which, in an event of changes in the operating point, changes comparatively slowly; and defining the injection parameter in dependence on the first value and the second value.

By means of the invention, the injection parameter is defined as a function of a first value of the internal combustion engine temperature and of a second value of the internal combustion engine temperature, with the two values changing at different speeds in the event of changes in the operating point of the internal combustion engine. The behavior of the real internal combustion engine temperature, which follows changes in operating point with a delay, can thereby be reproduced more accurately. As a result, a more precise adaptation of the injection parameter to the real internal combustion engine temperature is obtained, which leads to the desired reduction in HC emissions during the transition between different operating points of the internal combustion engine.

In accordance with an added mode of the invention, there is the step of defining the injection parameter in dependence on a difference between the first value and the second value.

In accordance with an additional mode of the invention, there is the step of defining the injection parameter such that an injection of a predefined proportion of a fuel quantity to be injected for an individual combustion is ended later for relatively large values of the difference than for relatively small values of the difference.

In accordance with a further mode of the invention, the injection parameter defines a start of the injection, and in that the injection of the fuel quantity to be injected for the individual combustion is started later for relatively large values of the difference than for relatively small values of the difference.

In accordance with an another mode of the invention, a later ending of the injection of the predefined proportion of the fuel quantity to be injected for the individual combustion takes place by means of a division of a total fuel quantity to be injected for the individual combustion into a plurality of injections.

In accordance with a further added mode of the invention, the later ending of the injection of the predefined proportion of the fuel quantity to be injected for the individual combustion with the division of the total fuel quantity to be injected for the individual combustion into the plurality of injections takes place in that a proportion of a fuel quantity injected with a later partial injection is increased and a proportion of the fuel injected with an earlier partial injection is reduced.

In accordance with an another additional mode of the invention, there is the step of forming the injection parameter as an injection pressure and the injection pressure is set such that the injection of a fuel quantity to be injected for the individual combustion takes place with a lower fuel pressure for relatively large values of the difference than for relatively small values of the difference.

In accordance with a concomitant mode of the invention, there is the step of calculating the temperature of the internal combustion engine as a function of operating parameters of the internal combustion engine.

It is self-evident that the features explained above and the features yet to be explained below can be used not only in the respectively specified combination but rather also in other combinations or individually without departing from the scope of the present invention.

Other features which are considered as characteristic for the invention are set forth in the appended claims.

Although the invention is illustrated and described herein as embodied in a method for controlling an internal combustion engine with a temperature-dependent injection parameter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
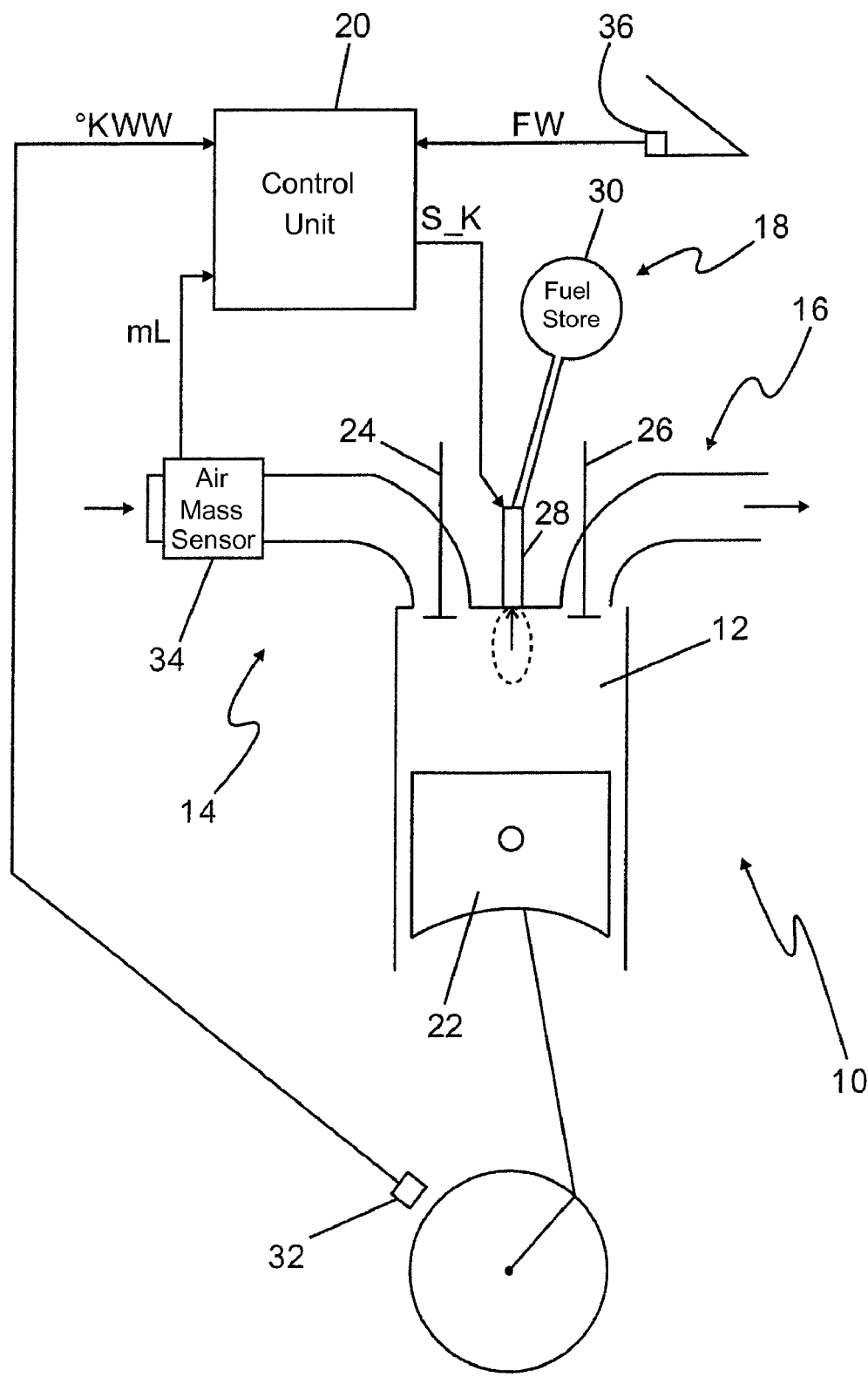
FIG. 1 is an illustration of a technical environment of the invention.

Referring now to the figures of the drawing in detail and first, particularly, to FIG. 1 thereof, there is shown an internal combustion engine 10 having a combustion chamber 12, an induction system 14, an exhaust system 16, a fuel system 18 and a control unit 20. The combustion chamber 12 is sealed off in a movable fashion by a piston 22. The exchange of the charge of the combustion chamber 12 is controlled synchronously with respect to the movement of the piston 22 by an inlet valve 24 and an outlet valve 26. An injection of fuel for an air charge of the combustion chamber 12 takes place by activating an injector 28, which is hydraulically connected to a pressurized fuel store 30, so as to open. FIG. 1 shows a combustion chamber 12 without a spark plug, in which auto-ignition of the combustion chamber charge takes place. The invention may be used both for internal combustion engines with auto-ignition and also in internal combustion engines with externally applied ignition, and in this respect, is not dependent on the combustion process which is used. Furthermore, the method can be used independently of the injector position.

The activation of the injector 28 takes place by the control unit 20 with a fuel control signal S_K. Here, the injection is varied by varying injection parameters. Typical injection parameters are the start and the duration of an injection, and also the injection pressure and if appropriate also the type of injection pattern. The injection of a certain fuel quantity to be dosed for a combustion chamber charge may take place for example by a single, continuous injection pulse duration or by a sequence of individual partial injections. Such single and multiple injections represent examples of different injection patterns.

The control unit 20 is otherwise set up, in particular programmed, to execute the method proposed here and/or one of its refinements, wherein an "execution" is to be understood to mean the control of the method sequence.

To form the fuel control signal S_K, the control unit 20 processes signals from various sensors. Of primary importance in this connection is an angle sensor arrangement 32 which provides an item of angle information ° KWW which represents the position of the piston 22 in the working cycle of the internal combustion engine 10. The angle sensor arrangement 32 contains, if appropriate, a crank angle sensor and a camshaft angle sensor. Furthermore, modern control units 20 process signals from a multiplicity of further sensors. In this connection, FIG. 1 shows an air mass sensor 34, which measures the air mass mL which flows into the combustion chambers of the internal combustion engine, and a driver demand transducer 36 which detects a torque demand FW by a driver.

Figure 2:
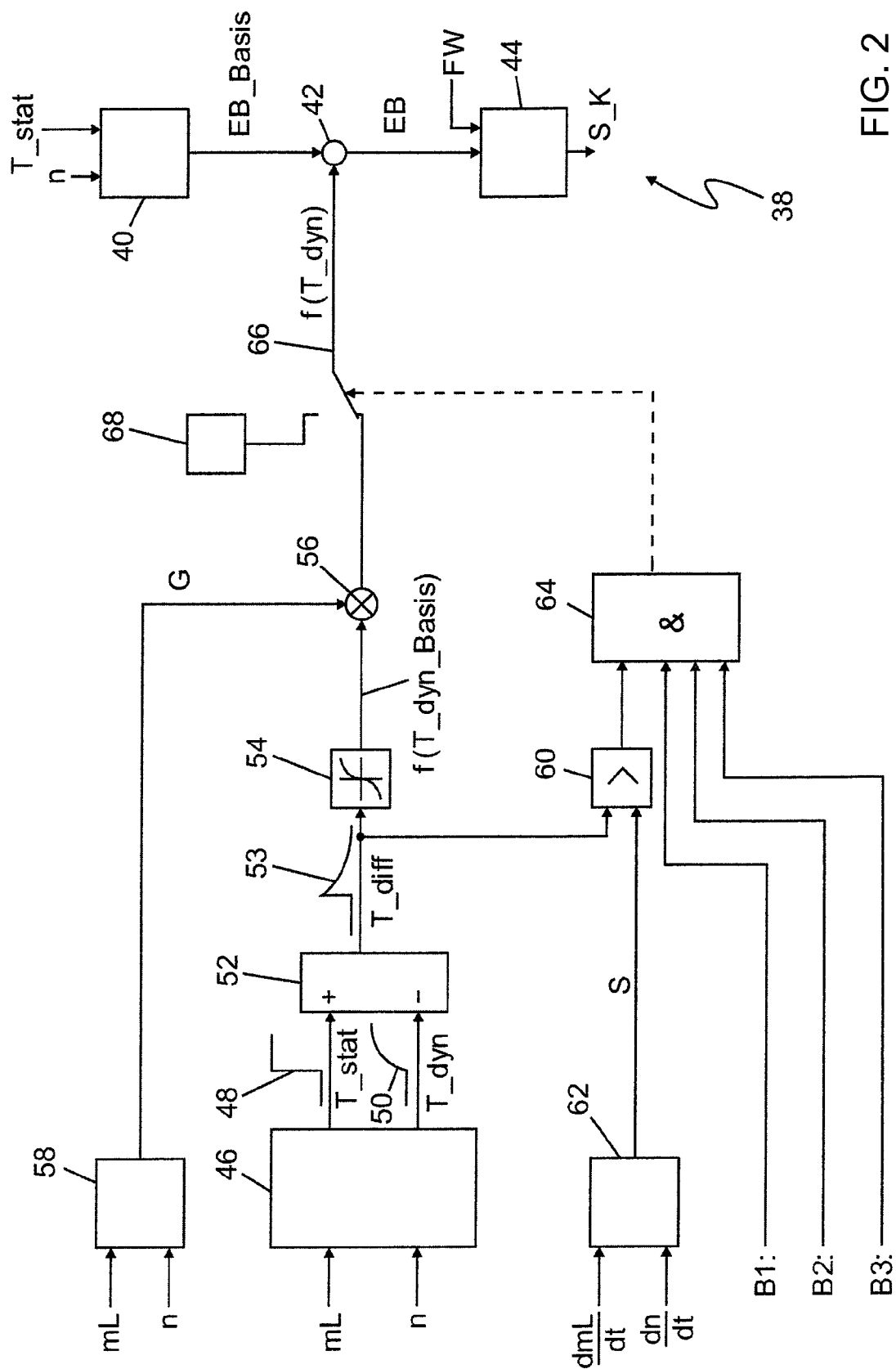
FIG. 2 is a functional block diagram of an exemplary embodiment of the invention.

FIG. 2 shows an exemplary embodiment of the invention in the form of functional blocks. Here, the functional blocks represent method steps and/or hardware structures. For example, a characteristic map block represents both the method step of the characteristic map access and also a memory in which the characteristic map is stored, and the associated addressing structures. FIG. 2 therefore discloses both method aspects and also device aspects of the present invention.

The vertical branch 38 represents a formation of the fuel control signal S_K. In a block 40, a base value EB_Basis of an injection parameter is formed as a function of characteristic operating variables of the internal combustion engine 10. In the illustrated refinement, the injection parameter is a start of injection EB which is determined in dependence on a rotational speed n and a temperature T_stat of the internal combustion engine 10. The rotational speed n is formed by the control unit 20 from the change in the item of angle information ° KWW over time. The temperature T_stat is modeled mathematically from characteristic operating variables of the internal combustion engine 10. Alternatively or in addition, the temperature T_stat is measured or influenced by a temperature sensor. The output signal of such a temperature sensor is, in one refinement, used in addition to the modeling for the adjustment of the mathematical model.

The temperature T_stat constitutes a first value of an internal combustion engine temperature which, in the event of changes in the operating point of the internal combustion engine, changes comparatively quickly to a value which is characteristic of the new operating point. The temperature T_stat represents a value which, in real operation, is generated when the internal combustion engine 10 is operated for a relatively long time at one operating point or in a small region around that operating point. Such operation is also referred to as transient operation. In the mathematical formation of T_stat, it is assumed that the temperature changes without a delay to a new value which applies for steady-state conditions at the new operating point. For example, if a digital load step takes place, the modeled temperature T_stat will likewise jump digitally to the new final value.

At a junction 42, the base value EB_Basis of the start of injection is linked with a corrective value f(T_dyn). The variable T_dyn corresponds to a second value of the internal combustion engine which, in the event of changes in the operating point of the internal combustion engine, changes comparatively slowly. Heat capacities of the combustion chamber charges and heat capacities of the participating components, for example of the piston crown, are taken into consideration in the calculation of the second value T_dyn of the internal combustion engine temperature. The corrective value f(T_dyn) represents the delay with which the real temperature of the internal combustion engine 10 follows the modeled temperature T_stat for steady-state operating states. The formation of the corrective value f(T_dyn) is explained further below.

The start of injection EB formed by the junction 42 constitutes an injection parameter which was determined in dependence on a temperature of the internal combustion engine 10, with a first value T_stat of an internal combustion engine temperature having first been determined which, in the event of changes in the operating point of the internal combustion engine, changes comparatively quickly to a value which is characteristic of the new operating point, and with a second value T_dyn of the internal combustion engine temperature having been formed which, in the event of changes in the operating mode, changes comparatively slowly, and with the injection parameter being defined in dependence on the first value T_stat and the second value T_dyn.

In a block 44, the fuel setting variable S_K is formed taking into consideration the corrected start of injection EB. In the refinement illustrated in FIG. 2, in addition to the start of injection EB, the block 44 also has supplied to it a characteristic operating variable which yields the fuel mass to be injected. For this, use is made primarily of the torque demand FW of the driver, which is if appropriate also supplemented by torque demands of other functions of the control unit or of networked control units, such as for example the function of driving dynamics regulation.

A refinement of a formation of the corrective value f(T_dyn) is explained below.

The block 46 represents a mathematical model which runs as a sub-program in the control unit 20 and which determines the first value T_stat of the internal combustion engine temperature and the second value T_dyn of the internal combustion engine temperature from operating parameters of the internal combustion engine. In one refinement, the determination takes place first by access to a characteristic map which is addressed with characteristic operating variables of the internal combustion engine which characterize a gas throughput through the internal combustion engine. Typical addressing variables are the load and rotational speed of the internal combustion engine, with the load being derived, for example, from the signal m of the air mass sensor 34. The characteristic map assigns the first value T_stat of the internal combustion engine temperature to each operating point of the internal combustion engine which is characterized by load and rotational speed. The operating-point-specific T_stat values are determined by test bed trials.

Furthermore, the second value T_dyn of the internal combustion engine temperature is formed in block 46. The formation of the second value T_dyn takes place for example by virtue of first values T_stat which follow one another in succession in the event of an operating point change being subjected to a low-pass filtering step. In the event of a fast operating point change, for example in the event of a fast depression of the accelerator pedal, the first value T_stat changes approximately in the form of a step 48, while the second value T_dyn changes approximately in the form of an e-function 50.

A difference T_diff between the step 48 and the e-function 50 is formed in the block 52. In the example considered, in the event of a fast operating point change, T_diff therefore changes initially in the manner of a step before then gradually falling, following a function, back to a neutral value. The T_diff profile 53 illustrated as an example results from the signal forms 48 and 50. From the magnitude of the difference T_diff, it is possible to infer how long ago the last operating point change took place and to what extent the process parameters such as gas temperatures and/or component temperatures have settled.

In one refinement, the corrective value f(T_dyn) is determined as a function of the temperature difference T_diff. Depending on whether the correction in the junction 42 has taken place by multiplication or addition, the neutral value of the corrective value f(T_dyn) is either equal to 1 or equal to 0. The neutral value has superposed on it the temperature difference T_diff or a value derived from the temperature difference T_diff, such that the corrective value f(T_dyn) deviates from its neutral value when the first value T_stat deviates from the second value T_dyn. The injection parameter is therefore defined as a function of a difference T_diff between the first value T_stat and the second value T_dyn.

In the refinement of FIG. 2, for the definition, a base value f(T_dyn_Basis) of the corrective value f(T_dyn) is first read out from a corrective characteristic map 54. For this purpose, the corrective characteristic map 54 is addressed with the temperature difference T_diff. The base value f(T_dyn_Basis) is subsequently multiplied, at a junction 56, with a weight factor G. The weight factor G is read out from a characteristic map 58 and specifies whether and to what extent the correction should have an effect at the respective operating points. In the refinement illustrated in FIG. 2, the weight factor G is read out from a characteristic map 58 as a function of the rotational speed n and the load of the internal combustion engine 10, with the load again being derived from the induction air mass flow mL.

A further refinement provides that the base value EB_Basis of the injection parameter is corrected only if the difference T_diff exceeds a threshold value. In the refinement illustrated in FIG. 2, the difference T_diff is compared, in the block 60, with a threshold value S. The threshold value S is read out from a characteristic map 62 which spans the load change and the rotational speed change. Here, the threshold value is predominantly dependent on the load change. The correction should for example be activated in the event of a load step from 50% load to full load even if the load step takes place at a constant rotational speed. The threshold value S is therefore preferably more heavily dependent on the load change than on the rotational speed change.

The characteristic map 62 makes it possible to take into consideration the time which is required for the second value T_dyn of the internal combustion engine temperature to align with the first value T_stat of the internal combustion engine temperature. The time is dependent on the respective operating point and on the magnitude of the load/rotational speed change. The temperature difference T_diff beyond which a correction of the injection parameter should take place is decided by the threshold value comparison in block 60. If the temperature difference T_diff does not exceed the threshold value, block 60 outputs a logic zero. The output of the AND block 64 is then also logic 0 and the switch 66 connects the block 68 to the junction 42.

The block 68 provides a neutral element for the junction in block 42, that is to say a one for a multiplicative junction or a zero for an additive junction. It is essential in any case that, in said refinement, no correction takes place at the junction 42 if the threshold value is not exceeded in the block 60.

The correction takes place only when all the inputs of the AND block 64 are supplied in each case with a logic one. The AND block 64 therefore allows the correction at the junction 42 to be restricted to cases in which predetermined conditions are met. In preferred refinements, the predetermined conditions are as now described.

B1: The cooling water temperature should lie above a certain threshold of, for example, 40° Celsius, since other functions which can influence the injection parameters are of greater significance below the threshold. Further conditions which are checked in refinements provide that B2: the load gradient and/or B3: the rotational speed gradient lie(s) within a respective predetermined interval.

The background for the conditions is that, in the case of comparatively shallow gradients of the stated variables, a correction, which reproduces dynamic influences, is not required at the junction 42, and in the case of comparatively steep gradients of the stated variables, the correction has a lower priority than, for example, the fast build-up of a demanded torque increase.

Up to this point, the invention has been explained on the basis of the example of a start of injection as an injection parameter. One preferred refinement provides, for the injection parameter, that the injection of a predefined proportion of a fuel quantity to be injected for an individual combustion is ended later for relatively large values of the difference than for relatively small values of the difference. The injection is therefore retarded to a certain extent, such that the piston is further remote from its top dead center position when the predefined proportion is reached.

It is also preferable that, for refinements in which the start of injection serves as an injection parameter to be corrected, the injection of the fuel quantity for the individual combustion is started later for relatively large values of the difference than for relatively small values of the difference.

Alternatively or in addition, it is preferable for the later ending of an injection of a predefined proportion of the fuel quantity to be injected for an individual combustion takes place by a division of the total fuel quantity to be injected for the individual combustion into a plurality of injections. A further preferred refinement provides that the later ending of the injection of a predefined proportion of the fuel quantity to be injected for an individual combustion with a division of the total fuel quantity to be injected for the individual combustion into a plurality of injections takes place in that the proportion of a fuel quantity injected with a later partial injection is increased and the proportion of the fuel injected with an earlier partial injection is reduced.

In this way, the proportion of the injected fuel which can precipitate on the piston crown is reduced.

It is alternatively or additionally preferable for the injection parameter to be an injection pressure and for the injection pressure to be set such that the injection of a fuel quantity to be injected for an individual combustion takes place with a lower fuel pressure for relatively large values of the difference than for relatively small values of the difference.

In this way, the penetration depth of the injected fuel cloud into the combustion chamber is reduced for relatively large values of the difference, such that the refinement also leads to a reduced condensation tendency. The adjustment of the pressure takes place by the activation of a fuel pump or of valves of the fuel system 30 by the control unit 20.

A further preferred refinement provides that the internal combustion engine temperature is calculated as a function of operating parameters of the internal combustion engine.

The invention claimed is:

1. A method for controlling an internal combustion engine with direct fuel injection, which comprises the steps of:
    determining an injection parameter in dependence on a temperature of the internal combustion engine, by performing the steps of:
        determining a first value of the temperature of the internal combustion engine which, in an event of changes in an operating point of the internal combustion engine, changes comparatively quickly to a value which is characteristic of a new operating point;
        forming a second value of the temperature of the internal combustion engine which, in an event of changes in the operating point, changes comparatively slowly; and
        defining the injection parameter in dependence on the first value and the second value.

2. The method according to claim 1, which further comprises calculating the temperature of the internal combustion engine as a function of operating parameters of the internal combustion engine.

3. The method according to claim 1, which further comprises defining the injection parameter in dependence on a difference between the first value and the second value.

4. The method according to claim 3, which further comprises defining the injection parameter such that an injection of a predefined proportion of a fuel quantity to be injected for an individual combustion is ended later for relatively large values of the difference than for relatively small values of the difference.

5. The method according to claim 4, wherein the injection parameter defines a start of the injection, and in that the injection of the fuel quantity to be injected for the individual combustion is started later for relatively large values of the difference than for relatively small values of the difference.

6. The method according to claim 4, which further comprises forming the injection parameter as an injection pressure and the injection pressure is set such that the injection of a fuel quantity to be injected for the individual combustion takes place with a lower fuel pressure for relatively large values of the difference than for relatively small values of the difference.

7. The method according to claim 4, wherein a later ending of the injection of the predefined proportion of the fuel quantity to be injected for the individual combustion takes place by means of a division of a total fuel quantity to be injected for the individual combustion into a plurality of injections.

8. The method according to claim 7, wherein the later ending of the injection of the predefined proportion of the fuel quantity to be injected for the individual combustion with the division of the total fuel quantity to be injected for the individual combustion into the plurality of injections takes place in that a proportion of a fuel quantity injected with a later partial injection is increased and a proportion of the fuel injected with an earlier partial injection is reduced.

* * * * *